United States Patent
Kornhaas

(10) Patent No.: US 10,214,095 B2
(45) Date of Patent: Feb. 26, 2019

(54) CLOSURE SYSTEM, IN PARTICULAR FOR A MOTOR VEHICLE

(71) Applicant: GM GLOBAL TECHNOLOGY OPERATIONS LLC, Detroit, MI (US)

(72) Inventor: Michael Kornhaas, Darmstadt (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/873,934

(22) Filed: Jan. 18, 2018

(65) Prior Publication Data

US 2018/0201120 A1 Jul. 19, 2018

(30) Foreign Application Priority Data

Jan. 18, 2017 (DE) .................. 10 2017 000 401

(51) Int. Cl.
*B60K 11/08* (2006.01)
*B60K 11/04* (2006.01)
*B60R 19/52* (2006.01)

(52) U.S. Cl.
CPC .............. *B60K 11/04* (2013.01); *B60R 19/52* (2013.01); *B60R 2019/525* (2013.01)

(58) Field of Classification Search
CPC .................................. B60K 11/085; F01P 7/12
See application file for complete search history.

(56) References Cited

U.S. PATENT DOCUMENTS

| | | | | |
|---|---|---|---|---|
| 4,312,381 A | * | 1/1982 | Ratner | ................ F16K 11/0525 137/595 |
| 2010/0243352 A1 | * | 9/2010 | Watanabe | ............ B60K 11/085 180/68.1 |

* cited by examiner

*Primary Examiner* — Bryan A Evans
(74) *Attorney, Agent, or Firm* — Lorenz & Kopf, LLP

(57) ABSTRACT

A closure or grille airflow shutter system, particularly for a motor vehicle includes a first shutter featuring at least one first adjustable shutter element with a first adjustment travel between a first and a second position. A second shutter features at least one second adjustable shutter element with a second adjustment travel between a first and a second position. A shutter coupling couples the first and the second shutters to one another in such a way that the second shutter element is not adjusted or adjusted over a first section of the second adjustment travel, which is smaller than the first section of the first adjustment travel, during an adjustment of the first shutter element over a first section of the first adjustment travel and adjusted over a second section of the second adjustment travel during an adjustment of the first shutter element over a second section of the first adjustment travel.

15 Claims, 1 Drawing Sheet

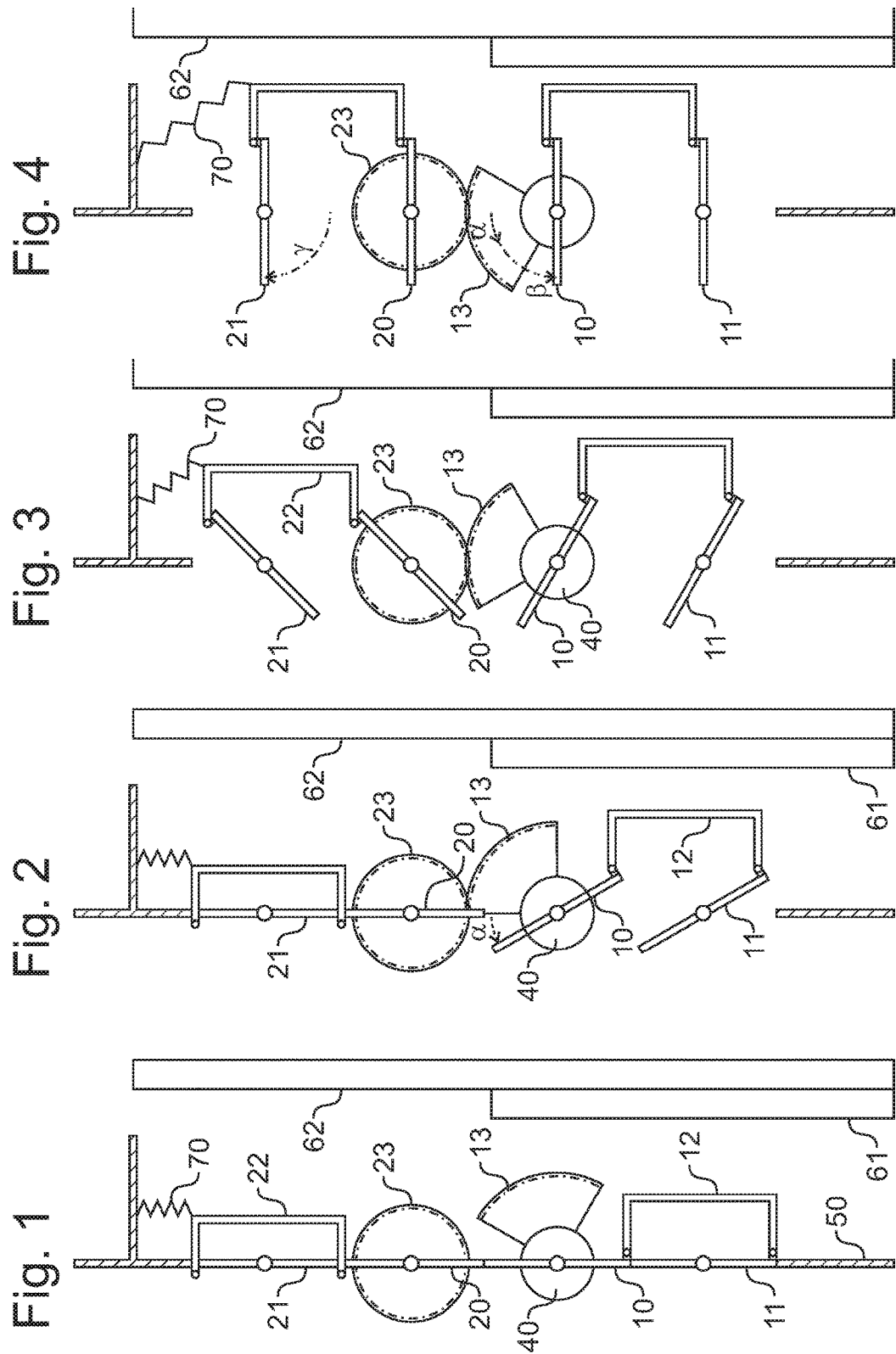

CLOSURE SYSTEM, IN PARTICULAR FOR A MOTOR VEHICLE

CROSS-REFERENCE TO RELATED APPLICATION

This application claims priority to German Patent Application No. 10 2017 000 401.3, filed Jan. 18, 2017, which is incorporated herein by reference in its entirety.

TECHNICAL FIELD

The present disclosure pertains to a closure system, particularly for a motor vehicle, to a motor vehicle, particularly a passenger car, with the closure system, as well as to a method for adjusting the closure system.

BACKGROUND

Grille airflow shutters are devices that control the amount of airflow through a front grille of a vehicle. The airflow control is typically based on cooling or warming needs for heat exchangers in a condenser, radiator, fan module located behind the grille. A greater airflow provides for better heat transfer out of the heat exchangers. When reduced or no airflow is desired, the grille airflow shutters are adjusted to block airflow through the grille, and, conversely, when additional air flow is desired the airflow shutters can be adjusted to allow full airflow through the grille.

Grille airflow shutters have generally been controlled using one of two methods. There are discrete open/shut shutters that only move between the open and shut positions, and the decision to open is based on reaching a particular temperature threshold, with the shutters remaining open continuously above this threshold, and the decision to close is based on dropping below this threshold, where the shutters remain continuously closed. However, this type of system provides less precise airflow control than is desired and may end up with repeated open/closed cycling if the temperature fluctuates around an open/close temperature threshold.

The other type of grille airflow shutter system overcomes the precision concern by using shutters that are variably controlled. That is, the shutters can be controlled to be in various positions of partial closure. With this control, the precise amount of airflow can be achieved by opening the shutters only the desired amount. These variable shutters are controlled with pulse width modulation. However, pulse width modulation, while allowing for the variable control of the shutters, adds significantly to both the cost of the physical hardware and to the complexity of the control algorithm and driver.

SUMMARY

The present disclosure provides an improved closure system in the form of a shutter system, particularly with respect to adjustment of the shutter system. According to an embodiment of the present disclosure, a grille airflow shutter system for a motor vehicle, such as a passenger car, includes a first shutter arrangement featuring one or more (first) shutter elements coupled to one another. The first shutter elements can be adjusted, particularly synchronous, over a maximum (first) adjustment travel of the shutter element or between first and second positions, particularly first and second end positions.

According to an embodiment of the present disclosure, the shutter system includes at least one additional shutter arrangement, which is referred to as second shutter arrangement featuring one or more (second) shutter elements coupled to one another. The second shutter elements can be adjusted, particularly synchronous, over a maximum (second) adjustment travel of the shutter element or between first and a second positions, particularly first and second end positions.

In an embodiment, one or more of the shutter elements are rotatable such that their adjustment travel corresponds to a rotational angle range and their first and second position correspond to a rotational angle or a rotational position. In an embodiment, one or more of the shutter elements are additionally or alternatively realized in the form of flaps, particularly in a slat-like fashion. In an embodiment, the shutter system is additionally or alternatively arranged or configured on an outer side or outer vehicle side, particularly on or behind a radiator grille, a radiator grille frame, and/or in front of or on one or more heat exchangers of the motor vehicle, particularly adjacent to the radiator grille and/or heat exchanger(s), more particularly between the radiator grille and the heat exchanger(s). In an embodiment, the shutter elements form ventilation flaps or slats of a radiator grille shutter system. This represents a particularly advantageous utilization of the present disclosure, but the present disclosure is not limited to this utilization only.

According to an embodiment of the present disclosure, the shutter system includes a shutter arrangement coupling, which couples the first and the second shutter arrangement, particularly at least one of their respective shutter elements, more particularly just one of their respective shutter elements, to one another in such a way that the second shutter elements are, due to an adjustment of the first shutter elements over a first section of the first adjustment travel, not or (only) adjusted over a first section of the second adjustment travel, which is less than the first section of the first adjustment travel. In particular, an absolute (|first section of second adjustment travel|<|first section of first adjustment travel|) and/or relative or respective adjustment travel ((first section of second adjustment travel)/(second adjustment travel)|<|(first section of first adjustment travel)/(first adjustment travel)|) and, particularly during or with, particularly due to an adjustment of the first shutter element or the first shutter elements over a second section of the first adjustment travel, adjusted over a section of the second adjustment travel, which is presently used as second section of the second adjustment travel. In an embodiment, the first section of the first adjustment travel is fixed with constructive or control technology. In another embodiment, the first section of the first adjustment travel is variable or adjustable with constructive or control technology.

In an embodiment, the second shutter arrangement can thereby remain unadjusted, particularly closed, when the first shutter arrangement is opened, particularly initially opened. Or in any case the first shutter arrangement is adjusted to a lesser extent, particularly opened to a lesser extent. In an embodiment, in which air is supplied through the first shutter arrangement that is already partially opened, the aerodynamics and/or thermodynamics, particularly a flow resistance of the motor vehicle, can thereby be improved due to the second shutter arrangement, which in this case is closed or in any case opened to a lesser extent.

In an embodiment, the first shutter elements of the first shutter arrangement are connected to or among one another by a shutter element coupling, which particularly differs and is spaced apart from the shutter arrangement coupling or is identical to this shutter arrangement coupling, particularly in such a way that they are adjusted synchronously and/or have the same adjustment travel. In an embodiment, the second shutter elements of the second shutter arrangement are additionally or alternatively connected to or among one another by a shutter element coupling, which particularly differs and is spaced apart from the shutter arrangement coupling or is identical to this shutter arrangement coupling, particularly in such a way that they are adjusted synchronously and/or have the same adjustment travel.

In an embodiment, the second section of the second adjustment travel is greater than the second section of the first adjustment travel, particularly absolute (|second section of second adjustment travel|>|second section of first adjustment travel|) and/or relative adjustment travel (|(second section of second adjustment travel)/(second second adjustment travel)|>|(second section of first adjustment travel)/(first adjustment travel)|). In an embodiment, the first and the second adjustment travel are additionally or alternatively at least essentially identical. In an embodiment, the second shutter arrangement or its second shutter element(s) accordingly is/are during or due to an adjustment of the first shutter arrangement over the second section, adjusted faster than this first shutter arrangement by the shutter arrangement coupling.

In an embodiment, the second shutter arrangement can thereby at least essentially make up an initial intentional "lag" and at least essentially open (completely) at the same time as the first shutter arrangement.

In an embodiment, the first section of the first adjustment travel amounts to at least 10%, preferable at least 20%, and particularly at least 50%, of the (overall) first adjustment travel and/or the second section of the first adjustment travel.

In an embodiment, in which air is already supplied in a thermodynamically advantageous fashion through the first shutter arrangement that is already partially opened, the aerodynamics and/or thermodynamics can thereby be improved due to the second shutter arrangement, which in this case is closed or in any case opened to a lesser extent.

In an embodiment, the first and the second shutter arrangement are decoupled from one another over the first section of the first adjustment travel or the shutter arrangement coupling is designed accordingly, particularly in such a way that the first and the second shutter arrangement are only coupled to one another over the second section of the first adjustment travel such that the second shutter element(s) is/are during an adjustment of the first shutter elements over the second section of the first adjustment travel adjusted over the second section of the second adjustment travel, but not adjusted during (due to) an adjustment of the first shutter elements over the first section of the first adjustment travel.

In an embodiment, the second shutter arrangement can thereby advantageously remain unadjusted, particularly closed, when the first shutter arrangement is opened, particularly initially opened, in a very simple and/or reliable fashion.

Additionally or alternatively, the first and the second shutter arrangement are in an embodiment rigidly coupled to one another over the second section of the first adjustment travel or the shutter arrangement coupling is designed accordingly, particularly in such a way that it rigidly couples the first and the second shutter arrangement or their shutter elements to one another over the second section of the first adjustment travel.

In an embodiment, the second shutter arrangement can thereby be advantageously adjusted in a particularly simple, precise and/or reliable fashion during an adjustment over the second section of the second adjustment travel.

In an embodiment, the shutter system includes a one-piece or multi-piece readjusting element, preferably a spring, and particularly a hydraulic, pneumatic, magnetic, electromagnetic, mechanical, elastic, readjusting spring, which prestresses or is designed for biasing the first and/or the second shutter arrangement, particularly one or more of their shutter elements and/or a shutter element coupling that couples the shutter elements of a shutter arrangement to or among one another, into a reference position, preferably into the first or second position of the first or second adjustment travel, and particularly is connected to this or these shutter element(s) or shutter element couplings.

In an embodiment, the second shutter arrangement can thereby advantageously remain unadjusted, particularly closed, when the first shutter arrangement is opened, preferably initially opened, in a particularly simple and/or reliable fashion. Additionally or alternatively, an adjustment of the shutter arrangement(s) can thereby be advantageously supported.

In an embodiment, the first shutter element of the first shutter arrangement and the second shutter element of the second shutter arrangement are arranged adjacent to one another in an adjusting direction of at least one of these shutter elements, particularly in a common adjusting direction. In an embodiment, the first shutter element of the first shutter arrangement and the second shutter element of the second shutter arrangement are arranged adjacent to one another transverse to this adjusting direction.

In an embodiment, two or more first shutter elements of the first shutter arrangement are additionally or alternatively arranged adjacent to one another in an adjusting direction of at least one of these shutter elements, particularly in a common adjusting direction.

In an embodiment, two or more first shutter elements of the first shutter arrangement are additionally or alternatively arranged adjacent to one another transverse to this adjusting direction.

In an embodiment, two or more second shutter elements of the second shutter arrangement are additionally or alternatively arranged adjacent to one another in an adjusting direction of at least one of these shutter elements, particularly in a common adjusting direction.

In an embodiment, two or more second shutter elements of the second shutter arrangement are additionally or alternatively arranged adjacent to one another transverse to this adjusting direction.

In an embodiment, a compact arrangement of the shutter elements, particularly matrix-like arrangement, can thereby be advantageously realized.

In an embodiment, the (overall) number of first shutter elements of the first shutter arrangement ("shutter element number") is smaller than the shutter element number of the second shutter arrangement. In an enhancement, the first shutter arrangement only includes one or a few first shutter elements, which are coupled to one another and synchronously adjusted or adjustable over the first adjustment travel, and multiple second shutter elements, which are coupled to one another and synchronously adjusted or adjustable over the second adjustment travel.

In an embodiment, in which air is already supplied in a thermodynamically advantageous fashion through the first shutter arrangement that is already partially opened, the aerodynamics and/or thermodynamics can thereby be advantageously improved due to the second shutter arrangement, which in this case is closed or in any case opened to a lesser extent.

In an embodiment, the first shutter element(s) of the first shutter arrangement and the second shutter element(s) of the second shutter arrangement can be adjusted in opposite directions to one another. In an embodiment, two or more first shutter elements can be additionally or alternatively adjusted in opposite directions to one another. In an embodiment, two more first shutter elements can be additionally or alternatively adjusted in opposite directions to one another.

In an embodiment, an advantageous coupling and/or advantageous adjustment kinematics of the shutter elements can thereby be realized and/or the aerodynamics and/or thermodynamics can be improved.

In an embodiment, the first position of the first adjustment travel and/or the first position of the second adjustment travel (respectively) is an end position, particularly a (maximally) closed end position. Additionally or alternatively, the second position of the first adjustment travel and/or the second position of the second adjustment travel (respectively) is an end position, particularly a (maximally) opened end position, in an embodiment. Additionally or alternatively, the second section of the first adjustment travel (directly) adjoins its first section in an embodiment. Additionally or alternatively, the second section of the second adjustment travel (directly) adjoins its first section or represents the overall (maximum) second adjustment travel in an embodiment. Additionally or alternatively, the first and the second section of the first adjustment travel jointly form the overall (maximum) first adjustment travel in an embodiment. A (maximum) adjustment travel also includes the corresponding first and/or second position, particularly end position, in an embodiment.

In an embodiment, an advantageous coupling and/or advantageous adjustment kinematics of the shutter elements can thereby be realized and/or the aerodynamics and/or thermodynamics can be improved.

In an embodiment, the shutter arrangement coupling is a passive coupling, which particularly includes no control and/or actuators and is not connected to an electric power supply and/or not controllable or adjustable, particularly a purely constructive coupling, and the first and the second shutter arrangement are (only) passively coupled to one another, particularly without a control and/or actuators and/or energy supply. In an enhancement, the passive shutter arrangement coupling may include a mechanical gear mechanism, particularly a segmented and/or toothed gear mechanism and/or a crank mechanism, which is connected to the first and the second shutter arrangement, particularly at least one of their shutter elements and/or a or the shutter element coupling.

In an embodiment, the second shutter arrangement can be advantageously adjusted in a particularly simple, precise, compact and/or reliable fashion.

In another complementary embodiment, the shutter arrangement coupling includes an actively controlled coupling. In an enhancement, it includes a first actuator, particularly the master actuator described below, for adjusting the first shutter arrangement and a second actuator, which is synchronized with the first actuator, particularly with respect to the control technology, for adjusting the second shutter arrangement.

In an embodiment, the second shutter arrangement can thereby be advantageously adjusted in a particularly flexible fashion.

In an embodiment, the shutter system includes a master actuator with an output element, which is connected to the first or second shutter arrangement, particularly one or more of their shutter elements and/or a or the shutter element coupling, which couples these shutter elements to one another. In an enhancement, the output element may include, particularly includes, an output shaft, particularly of an electric motor, or an output element of a mechanism, particularly in the form of a gear, a belt, a cable, a rod or the like of a gear mechanism, a belt mechanism, a cable or rod mechanism or the like.

In an embodiment, the shutter arrangement can thereby be advantageously adjusted in a particularly simple, precise, compact and/or reliable fashion.

According to an embodiment of the present disclosure, the first shutter element(s) is/are selectively adjusted into a position in the first or second section of the first adjustment travel, particularly selectively adjusted over the first or second section of the first adjustment travel, particularly by the master actuator, in order to adjust the shutter system and the second shutter element(s) is/are in the process, particularly due to this process, not adjusted or only adjusted over the first section of the second adjustment travel during an adjustment of the first shutter elements over the first section of the first adjustment travel and adjusted over the second section of the second adjustment travel during an adjustment of the first shutter elements over the second section of the first adjustment travel, particularly by the shutter arrangement coupling.

Means or controller in the context of the present disclosure may be realized in the form of hardware and/or in the form of software technology, particularly in the form of a digital processing unit, such as a microprocessor unit (CPU), which is data-linked and signal-linked to a storage and/or bus system, and further includes one or more programs or program modules. The CPU may be configured to process commands that are implemented in the form of a program stored in a storage system, for acquiring input signals from a data bus and/or for delivering output signals to a data bus. A storage system may include one or more storage mediums, particularly different storage mediums, particularly optical, magnetic, solid state and/or other non-volatile mediums. The program may be realized in such a way that it embodies or is capable of carrying out the methods described herein such that the CPU can carry out the steps of such methods, particularly in order to adjust the shutter system.

In an embodiment, one or more steps of the method, particularly all steps, are carried out in a completely or partially automated fashion.

BRIEF DESCRIPTION OF THE DRAWINGS

The present disclosure will hereinafter be described in conjunction with the following drawing figures, wherein like numerals denote like elements, and:

FIG. 1 shows a shutter system according to an embodiment of the present disclosure with two first and two second shutter elements in their closed end positions;

FIG. 2 shows the shutter system with the two first shutter elements, which are adjusted over a first section of their adjustment travel;

FIG. 3 shows the shutter system with the two first and second shutter elements in a position in the second section of their adjustment travel; and FIG. 4 shows the shutter system with the two first and second shutter elements in an opened end position of the second section of the adjustment travel.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

FIG. 1 shows a grille airflow shutter system according to an embodiment of the present disclosure. This shutter system includes a first shutter arrangement, which includes two first shutter elements in the form of rotatably mounted ventilation flaps or slats 10, 11 that are coupled to one another by a shutter element coupling 12 and can be synchronously adjusted over a maximum first adjustment travel between a first, completely closed end position (see FIG. 1) and a second, completely open end position (see FIG. 4).

The shutter system also includes a master actuator with an output element 40 that is connected to the ventilation flap or slat 10 in a rotationally rigid fashion.

The shutter system furthermore includes a second shutter arrangement, which features two second shutter elements in the form of rotatably mounted ventilation flaps or slats 20, 21 that are coupled to one another by an additional shutter element coupling 22 and can be synchronously adjusted over a maximum second adjustment travel between a first, completely closed end position (see FIGS. 1, 2) and a second, completely open end position (see FIG. 4).

The shutter system is arranged on a frame 50 of a radiator grille of a motor vehicle and forms a radiator grille shutter system.

In addition to the two shutter element couplings 12, 22, the shutter system also includes a separate shutter arrangement coupling in the form of a gear mechanism with a segmented first gear 13, which is connected to the first ventilation flap or slat 10 in a rotationally rigid fashion, and a second gear 23, which is connected to the second ventilation flap or slat 20 in a rotationally rigid fashion.

The two gears 13, 23 engage with one another when the ventilation flap or slat 10 is displaced over a first section α of its adjustment travel (see FIG. 2) and are engaged with one another when the ventilation flap or slat 10 is adjusted over an adjacent second section β of its adjustment travel (see FIGS. 3, 4).

In this way, the shutter arrangement coupling in the form of a gear mechanism 13, 23 couples the first and the second shutter arrangement to one another in such a way that the second shutter elements 20, 21 are not adjusted during an adjustment of the first shutter elements 10, 11 over the first section α of the first adjustment travel (see FIG. 2) and adjusted over a second section γ of the second adjustment travel, which corresponds to the complete second adjustment travel (see FIG. 4), during an adjustment of the first shutter elements 10, 11 over the second section β of the first adjustment travel.

The transmission ratio of the gear mechanism or the two gears 13, 23 is chosen such that the first and the second shutter elements 10, 11, 20, 21 reach their (completely) open end positions (see FIG. 4) simultaneously. Accordingly, the second section γ of the second adjustment travel is greater than the second section β of the first adjustment travel relative or referred to the respective adjustment travel ($|\gamma/\gamma|=1>|\beta/(\alpha+\beta)|<1$), as well as absolute ($|\gamma|>|\beta|$). The shutter arrangement coupling 13, 23 adjusts the second shutter arrangement or its second shutter elements 20, 21 faster than the first shutter elements 10, 11 during an adjustment of the first shutter arrangement over the respective second section β or γ.

In the exemplary embodiment, the first section α of the first adjustment travel ($\alpha+\beta$) amounts to at least 10% of the first adjustment travel ($\alpha+\beta$) and its second section β ($\alpha\geq0.1\cdot(\alpha+\beta)$; $\alpha\geq0.1\cdot\beta$).

Due to the segmented first gear 13, the first and the second shutter arrangement are decoupled from one another over the first section α of the first adjustment travel ($\alpha+\beta$). Over the second section β of the first adjustment travel ($\alpha+\beta$), however, the first and the second shutter arrangement are rigidly coupled to one another by the gears 13, 23, which are engaged in this case.

The shutter system includes an elastic spring 70, which prestresses the second shutter arrangement into the closed first end position and is connected to its shutter element coupling 22 for this purpose.

In the exemplary embodiment, the first shutter elements 10, 11 and the second shutter elements 20, 21 are all arranged adjacent to one another in a common adjusting direction (vertically in FIGS. 1-4). Additionally or alternatively, (additional) first and/or second shutter elements—not visible in the illustrations in FIGS. 1-4—may be analogously provided and coupled to the first and second shutter elements 10 and/or 11 and 20 and/or 21 by the respective shutter element coupling 12 and 22. These additional first and/or second shutter elements are synchronously adjusted over the respective adjustment travel and arranged adjacent to one another transverse to this adjusting direction (perpendicular to the plane of projection of FIGS. 1-4).

Two respective shutter elements 10, 11 and 20, 21 are illustrated in the exemplary embodiment in order to provide more compact drawings. In an embodiment, however, the shutter element number of the first shutter arrangement may also be smaller than the shutter element number of the second shutter arrangement. The first shutter element 11 may, for example, be eliminated and/or additional second shutter elements may be analogously provided.

The first shutter elements 10, 11 are adjusted in the opposite direction to the second shutter elements 20, 21 by the gear mechanism 13, 23. In the exemplary embodiment, the shutter arrangement coupling 13, 23 is a passive coupling. In a modification, the gear mechanism 13, 23 may also be replaced with an actively controlled shutter arrangement coupling, which includes the master actuator for adjusting the first shutter arrangement and a second actuator, which is synchronized with the first actuator with respect to the control technology, for adjusting the second shutter arrangement. These synchronized actuators replicate the passive coupling 13, 23 with control technology.

In order to adjust the shutter system, the first shutter elements 10, 11 are selectively adjusted into a position in the first section α or a position in the second section β of the first adjustment travel by the master actuator, for example into one of the positions illustrated in FIGS. 1-4. The second shutter elements are in the process not adjusted by the shutter arrangement coupling 13, 23 during an adjustment of the first shutter elements 10, 11 over the first section α of the first adjustment travel (see FIG. 1→FIG. 2) and adjusted over the greater second section γ of the second adjustment travel during an adjustment of the first shutter elements 10, 11 over the second section β of the first adjustment travel (see FIG. 2→FIG. 4) such that they simultaneously reach their open end positions (see FIG. 4).

In this way, only a first heat exchanger 61 can essentially be subjected to an air flow through the first shutter arrangement (see FIG. 2), particularly initially, while the second shutter arrangement still remains closed such that an aerodynamic resistance of the motor vehicle is improved. If so required, a second heat exchanger 62 can then also be subjected to an air flow with an additional adjustment of the shutter elements 10, 11 and a coupled faster adjustment of the shutter elements 20, 21.

Although exemplary embodiments were elucidated in the preceding description, it should be noted that numerous modifications are possible. In the exemplary embodiment, the radiator grille shutter system is arranged on the radiator grille frame 50, but the radiator grille shutter system may in a modified embodiment likewise be arranged, in particular, behind the radiator grille frame 50 and in front of the heat exchangers 61, 62.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

The invention claimed is:

1. A shutter system for a motor vehicle, comprising:
a first shutter arrangement including at least one first adjustable shutter element having a first adjustment travel between a first and second position;
a second shutter arrangement including at least one second adjustable shutter element having a second adjustment travel between a third and fourth position; and
a shutter arrangement coupling configured to couple the first and the second shutter arrangements to one another in such a way that the second shutter element is adjusted over a first section of the second adjustment travel, which is smaller than the first section of the first adjustment travel during an adjustment of the first shutter element over a first section of the first adjustment travel, and the second shutter element is adjusted over a second section of the second adjustment travel during an adjustment of the first shutter element over a second section of the first adjustment travel; and
a gear mechanism having a segmented first gear connected to the first shutter arrangement and a second gear connected to the second shutter arrangement, the second gear selectively engaged with the first gear, a rotation of the first gear adjusts the first shutter element over the first section of the first adjustment travel and adjusts the second shutter element over the first section of the second adjustment travel, and a further rotation of the first gear adjusts the first shutter element over the second section of the first adjustment travel and rotates the second gear to adjust the second shutter element over the second section of the second adjustment travel.

2. The shutter system according to claim 1, wherein the second section of the second adjustment travel is greater than the second section of the first adjustment travel.

3. The shutter system according to claim 1, wherein the first section of the first adjustment travel amounts to at least 10% of the first adjustment travel or the second section.

4. The shutter system according to claim 1, wherein the first and the second shutter arrangement are decoupled from one another over the first section of the first adjustment travel and coupled to one another over the second section of the first adjustment travel.

5. The shutter system according to claim 1, comprising a readjusting element configured to bias at least one of the shutter arrangements into a reference position.

6. The shutter system according to claim 1, wherein at least two of the shutter elements are arranged adjacent to one another in an adjusting direction of at least one shutter element.

7. The shutter system according to claim 1, wherein at least two of the shutter elements are arranged transverse to one another in an adjusting direction of at least one shutter element.

8. The shutter system according to claim 1, wherein the first shutter arrangement comprises at least two first shutter elements and the second shutter arrangement comprises at least two second shutter elements, wherein the number of the element of the first shutter arrangement is less than the number of the element of the second shutter arrangement.

9. The shutter system according to claim 1, wherein at least two of the shutter elements are adjusted in opposite directions relative to one another.

10. The shutter system according to claim 1, wherein the first position of at least one of the adjustment travel is a closed end position and the second position of at least one of the adjustment travel is an open end position.

11. The shutter system according to claim 10, wherein the first and second sections of at least one of the adjustment travel adjoin one another.

12. The shutter system according to claim 1, comprising a master actuator with an output element connected to at least one of the first or second shutter arrangement.

13. A method for adjusting a shutter system for a motor vehicle that includes a first shutter arrangement including at least one first adjustable shutter element having a first adjustment travel between a first and second position, a second shutter arrangement including at least one second adjustable shutter element having a second adjustment travel between a third and fourth position and a shutter arrangement coupling configured to couple the first and the second shutter arrangements to one another in such a way that the second shutter element is adjusted over a first section of the second adjustment travel, which is smaller than the first section of the first adjustment travel during an adjustment of the first shutter element over a first section of the first adjustment travel, and is adjusted over a second section of the second adjustment travel during an adjustment of the first shutter element over a second section of the first adjustment travel, the method comprising:
selectively adjusting the first shutter element into a position in the first or second section of the first adjustment travel;
selectively adjusting the second shutter element over the first section of the second adjustment travel during an adjustment of the first shutter element over the first section of the first adjustment travel; and
selectively adjusting the second shutter element over the second section of the second adjustment travel during an adjustment of the first shutter element over the second section of the first adjustment travel.

14. A method for adjusting a shutter system according to claim 13, the method comprising:
selectively adjusting the first shutter element into a position in one of the first or second section of the first adjustment travel;

selectively adjusting the second shutter element due to this process, only over the first section of the second adjustment travel during an adjustment of the first shutter element over the first section of the first adjustment travel; and selectively adjusting the second shutter element over the second section of the second adjustment travel during an adjustment of the first shutter element over the second section of the first adjustment travel.

15. A motor vehicle comprising:

a radiator grille frame;

at least one heat exchanger positioned adjacent to the radiator grille frame; and an airflow shutter system supported on the radiator grille frame and located upstream of the at least one heat exchanger, the airflow shutter system including:

a first shutter arrangement including at least one first adjustable shutter element having a first adjustment travel between a first and second position;

a second shutter arrangement including at least one second adjustable shutter element having a second adjustment travel between a third and fourth position;

a coupling configured to couple the first and the second shutter arrangements to one another such that the second shutter element is adjusted over a first section of the second adjustment travel, which is less than the first section of the first adjustment travel during an adjustment of the first shutter element over a first section of the first adjustment travel, and the second shutter element is adjusted over a second section of the second adjustment travel during an adjustment of the first shutter element over a second section of the first adjustment travel; and a gear mechanism having a segmented first gear connected to the first shutter arrangement and a second gear connected to the second shutter arrangement, the second gear selectively engaged with the first gear, a rotation of the first gear adjusts the first shutter element over the first section of the first adjustment travel and adjusts the second shutter element over the first section of the second adjustment travel, and a further rotation of the first gear adjusts the first shutter element over the second section of the first adjustment travel and rotates the second gear to adjust the second shutter element over the second section of the second adjustment travel.

* * * * *